US006606623B1

(12) United States Patent
Hsieh et al.

(10) Patent No.: US 6,606,623 B1
(45) Date of Patent: Aug. 12, 2003

(54) METHOD AND APPARATUS FOR CONTENT-BASED IMAGE RETRIEVAL WITH LEARNING FUNCTION

(75) Inventors: Jun-Wei Hsieh, Hsinchu (TW); Cheng-Chin Chiang, Hsinchu (TW); Yea-Shuan Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/388,483

(22) Filed: Sep. 2, 1999

Related U.S. Application Data
(60) Provisional application No. 60/128,547, filed on Apr. 9, 1999.

(51) Int. Cl.$^7$ .............................................. G06F 17/30
(52) U.S. Cl. ...................................... 707/5; 707/104.1
(58) Field of Search .............................. 707/5, 102, 4, 707/104.1; 382/156, 155

(56) References Cited

U.S. PATENT DOCUMENTS

| | | | | |
|---|---|---|---|---|
| 5,586,316 A | | 12/1996 | Tanaka et al. ................... | 707/4 |
| 5,588,149 A | | 12/1996 | Hirose ............................ | 707/1 |
| 5,623,690 A | | 4/1997 | Palmer et al. ............. | 707/500.1 |
| 5,644,765 A | | 7/1997 | Shimura et al. ......... | 707/104.1 |
| 5,659,742 A | | 8/1997 | Beattie et al. ........... | 707/104.1 |
| 5,911,139 A | * | 6/1999 | Jain et al. ....................... | 707/3 |
| 5,950,189 A | * | 9/1999 | Cohen et al. ................... | 707/3 |
| 6,345,274 B1 | * | 2/2002 | Zhu et al. ....................... | 707/5 |
| 6,418,432 B1 | * | 7/2002 | Cohen et al. ................... | 707/5 |

OTHER PUBLICATIONS

J. Smith, et al., "VisualSEEK: A Fully Automated Content-based Image Query System," Proc. ACM International Conference on Multimedia, pp. 87–98, Nov. 1996.

W. Niblack, et al., "The QBIC Project: Querying Images by Content Using Color, Texture, and Shape," in Proc. SPIE Storage and Retrieval for Image and Video Databases, vol. 1908, pp. 173–187, Feb. 1993.

Y. Rui, et al., "Relevance Feedback: A Power tool for Interactive Content–based Image Retrieval," IEEE Trans. Circuits and Systems for Video Technology, vol. 8, No. 5, pp. 644–655, Sep. 1998.

O. Maron, et al., "Multiple Instance Learning from Natural Scene Classification," Proceedings of the 14$^{th}$ International Conference on Machine Learning, 1997.

* cited by examiner

*Primary Examiner*—Greta Robinson

(57) ABSTRACT

An apparatus and method of content-based image retrieval generate a plurality of training images, including a first part and a second part. Each training image of the first part is labeled as one of a positive bag or a negative bag. The training image is labeled a positive bag if the training image has a desirable character and labeled a negative bag if the training image does not have a desirable character. A set of N1 training images is identified from a set of all training images of the second part, which identified images have a feature most closely matching a first feature instance of a training image labeled as a positive bag. A first value corresponding to the first feature instance is calculated, based on the number of images labeled as positive bags that are identified in the set of N1 training images.

11 Claims, 10 Drawing Sheets

INSTANCE = { C, A-C, B-C, D-C, E-C }

INSTANCE = { A, B, C, D }

INSTANCE = { A, B, C }

METHOD AND APPARATUS FOR CONTENT-BASED IMAGE RETRIEVAL WITH LEARNING FUNCTION

This application claims the benefit of U.S. Provisional Application Number 60/128,547 filed Apr. 9, 1999, the subject matter of which is incorporated by reference herein in its entirety.

BACKGROUND OF THE INVENTION

1. Field of the Invention

The present invention relates to content-based search and retrieval of visual images from digital image databases. More particularly, this invention relates to a content-based image retrieval system that learns a desired visual concept based on user feedback information on selected training images.

2. Description of the Related Art

With advances in computer technologies and the World Wide Web (WWW), content-based image retrieval has gained considerable attention recently. The following documents provide background information relating to this field; each of these documents is incorporated by reference herein in its entirety.

[1] J. Smith and S. Chang, "VisualSEEK: A Fully Automated Content-based Image Query System", *Proc. ACM International Conference on Multimedia,* pages 87–98, November 1996.

[2] W. Niblack, R. Barber et al., "The QBIC Project: Querying Images by Content Using Color, Texture, and Shape," in *Proc. SPIE Storage and retrieval for image and video Databases,* vol. 1908, pages 173–187, February 1993.

[3] J. R. Bach, C. Fuller et al., "The Virage Image Search Engine: An Open Framework for Image Management," in *Proc. SPIE and Retrieval for Image and Video Databases.*

[4] Y. Rui, T. S. Huang, M. Ortega, and S. Mehrotra, "Relevance Feedback: A Power Tool for Interactive Content-based Image Retrieval", *IEEE trans. Circuits and systems for video technology,* vol. 8, no. 5, pages 644–655, September 1998.

[5] P. Lipson, E. Grimson, and P. Sinha, "Context and Configuration Based Scene Classification", *Proceedings of IEEE Int. Conf. On Computer Vision and Pattern Recognition,* 1997.

[6] O. Maron, "Learning from Ambiguity", Doctoral Thesis, Dept. of Electrical Engineering and Computer Science, M.I.T., June 1998.

[7] O. Maron and A. L. Ratan, "Multiple Instance Learning from Natural Scene Classification", *Proceedings of the 14th International Conference on Machine Learning,* 1997.

[8] U.S. Pat. No. 5,793,888 to Delanoy, "Machine Learning Apparatus and Method for Image Searching," 1998.

[9] U.S. Pat. No. 5,696,964 to Ingemar, et al., "Multimedia Database Retrieval System . . . ," 1997.

[10] U.S. Pat. No. 5,586,316 to Tanaka et al., "System and Method for Information Retrieval with Scaled Down Image," 1996.

[11] U.S. Pat. No. 5,588,149 to Hirose, "Document Classification and Retrieval with Title-Based On-The-Fly Class Merge," 1996.

[12] U.S. Pat. No. 5,623,690 to Palmer et al., "Audio/Video Storage and Retrieval for Multimedia Workstations by Interleaving Audio and Video Data in Data File," 1997.

[13] U.S. Pat. No. 5,644,765 to Shimura et al., "Image Retrieving Method and Apparatus That Calculates Characteristic Amounts of Data Correlated With and Identifying an Image," 1997.

[14] U.S. Pat. No. 5,659,742 to Beattie et al., "Method for Storing Multi-Media Information in an Information Retrieval System," 1997.

Some of the terminology used herein will now be defined. "Low-level features" are properties or attributes such as color, texture and shape. U.S. Pat. No. 5,696,964 discusses specific examples of such properties. "High-level concepts" are, for example, discernible images such as apples, trees, automobiles, etc. "Spatial properties" are size, location, and the relative relationship to other regions. A "target concept" is the concept learned by the image retrieval system based on the results of images queried by a user. A "target image" is defined as an image retrieved from a database by the image retrieval system as meeting the criteria of the target concept.

For image-based retrieval systems, the most commonly used approach as represented by reference [1] is to exploit low-level features and spatial properties as keys to retrieve images. Although this approach has the benefit of being simple, it leaves a large gap between the retrieval of low-level features and high-level concepts embedded in the image contents.

To address this challenge, references [5], [6] and [7] have investigated a method for learning visual concepts from a set of examples for some specific scene classification. This research has illustrated that visual concepts can be learned from a set of positive and negative examples to successfully classify natural scenes with impressive results. The framework used in this research is called "Multiple Instance Learning."

The approach used in references [6] and [7] considers a data image as comprising a number of subimages or feature instances which represent different high-level visual concepts such as cars, people, or trees. In the terminology of these references, a collection of subimages or feature instances is called a bag. Each bag corresponds to one of the data images. A bag is labeled negative if all of its feature instances are negative, and positive if at least one of its feature instances is positive. Each feature instance in the bag is a possible description of a visual high-level concept. A basic assumption is that the learned or target concept can not contain any feature instances from negative bags. Given a number of bags (positive or negative), a method called Diverse Density (DD) is employed to learn the visual concept from examples or images containing multiple feature instances. The algorithm attempts to locate the optimal position of the target concept in feature space by a gradient optimization method. This optimization method iteratively updates the best position by maximizing the defined diverse density measure from multiple starting points.

However, there are several problems associated with the DD method. A major problem in the DD algorithm is the selection of starting points. In addition, iterative nonlinear optimization can be time consuming and can also prohibit on-line learning of visual concepts. Another common problem incurred in the learning process is the under-training problem, which occurs when an insufficient number of training instances, either positive or negative, are provided. Intuitively, an insufficient number of training instances causes the high-level concept embedded in the retrieved image to be imprecise because of insufficient training.

SUMMARY OF THE INVENTION

The present invention provides a novel technique that overcomes the under-training problem frequently suffered in prior art techniques. Since no time-consuming optimization process is involved, the system learns, the visual concepts extremely fast. Therefore, the target concept can be learned on-line and is user-adaptable for effective retrieval of image contents.

More particularly, this invention provides a novel method to let users retrieve interesting images by learning the embedded target visual concept from a set of given examples. Through user'srelevance feedback, the visual concept can be effectively learned to classify images, which contain common visual entities. The learning process is started by the user developing a query. In response to the user's query, the system retrieves a set of query results from which a set of training examples (which may be positive or negative) can be selected to interactively adjust the query concept according to the user's feedback information indicating whether or not the retrieval examples match the user's query.

According to one embodiment, a method is provided to find the commonality of instances for learning a visual concept through a user's feedback information. Under the assumption that high-level concepts can be captured by a set of feature instances, the method establishes a linkage between high-level concepts and low-level features. Before the training and retrieving process, each training example is first analyzed to extract a number of instances, which serve as keys to comprise the basic representation of different visual concepts. During the retrieving phase, through the user's assignment of feedback information, the training images, subdivided into subimages (or feature instances), are labeled by the user as either positive or negative. Based on this assignment, the learning process finds the commonality of feature instances from the training examples without involving any optimization process. Then, the retrieving phase fetches desired images from databases according to the learned concept.

One major difference between the method of the present invention and the DD technique is that the present invention analyzes not only the explicit positive and negative training examples generated in response to the user's query but also analyzes the overall retrieved output some of which is not seen by the users. The consideration of the unseen (implicit) retrieved output enlarges the number of training examples and thus obviates the under-training problem. In other words, prior art methods utilize the user's feedback information to consider only the explicit training examples in the output list. In contrast, the present method automatically references additional implicit training images from the unseen retrieved results which do not need further analysis and assignment by the user to label the results as positive and negative. Therefore, the high level concept embedded in an image can be learned more completely and precisely. Furthermore, during the learning process, since no time-consuming optimization process is applied by this invention, real-time and on-line learning can be achieved.

DESCRIPTION OF THE PREFERRED EMBODIMENTS

Figure 1:
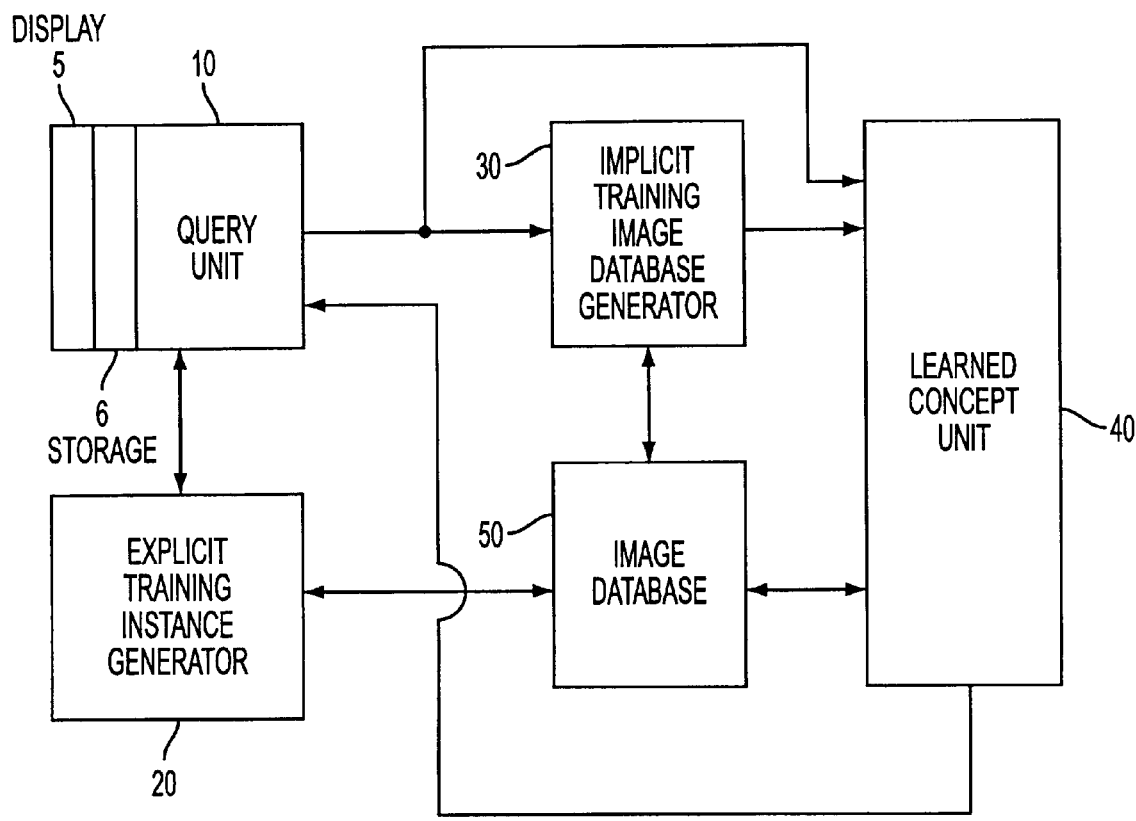
FIG. 1 is a block diagram of an apparatus for content-based image retrieval according to the present invention.

FIG. 1 shows an illustrative embodiment of a content-based image retrieval apparatus of the present invention. In FIG. 1 content-based image retrieval apparatus 100 comprises a query unit 10 which includes a display unit 5 having a monitor to display image data and a storage unit 6 which stores retrieved images from image database 50. Image database 50 is a collection of data that includes graphical images, visual images or video images. A data image is defined as a visual image or picture, such as a scene containing elements (high-level concepts) such as cars, people, trees and the like. Generally, each data image in the database possesses a set of features or attributes, and a user may wish to conduct a search of the database based upon a value of one or more of the attributes. As examples of the type of database, database 50 may be data stored at a single location or it may be contained in memory at a plurality of locations; it may comprise all data accessible over the Internet or the WWW or it may be a database on a single memory unit including e.g. a set of COREL™ images. Display unit 5 may be physically located in the same location or in a different location as query unit 10. For example, query unit 10 and the other elements of apparatus 100 may reside on a server accessed over a network or a series of networks (e.g., the Internet). Display unit 5 can be, for example, the monitor of a user's home computer. It should therefore be noted that the apparatus of the present invention may comprise a plurality of devices connected e.g. over a network such as the Internet or it may comprise an apparatus housed as a single unit.

Query unit 10 includes a computer which is programmed to allow a user to interactively select low-level features or attributes, such as colors, shapes or textures, or high-level concepts or instances, such as sunsets or waterfalls. In other words, using query unit 10, the user may develop a query index or key to query data from image database 50. Query unit 10 may further comprise a keyboard and/or a mouse (both not shown) as two examples of input devices by which a user might input information to interactively query an image and provide feedback information as to the feature instances of the retrieved images. Alternatively, a touch screen or voice-activated selection software can be used as input devices to input information to query an image.

Figure 3A:
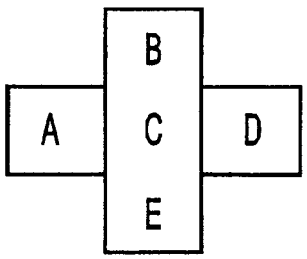
FIG. 3 shows types of feature instances generated by different methods.
Figure 3B:
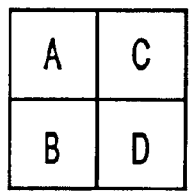
Figure 3C:
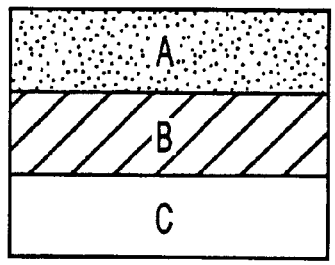

FIGS. 3A, 3B and 3C are examples of types of feature instances. A feature instance is defined as a subimage of an original data image and is described as a point in feature space. A collection of feature instances is called a bag. The bag thus corresponds to the data image, which in turn is made up of subimages or feature instances. In FIG. 3A, the feature instance is represented as the mean RGB values of the central pixel (in this case "C") and the relative color differences with its four neighbors. Therefore, in this case, the feature instance can be represented as a vector with 15 elements. By normalizing the size of each data image, a set of instances can be extracted from it. In other words, each data image corresponds to a bag, which is defined as a collection of feature instances. In FIG. 3B, the feature instance is represented as the color of each of the pixels in a 2×2 set of neighbors given by a vector with 12 elements where each pixel has three color values (RGB). In FIG. 3C, an instance is the mean color of the center pixel and the relative color differences with its up and down neighbors. It should be noted that these examples represent merely three types of feature instances; the above-identified background art provides additional details of types of feature instances. The term feature instance as used herein is not limited to the above examples, as many additional examples of feature instances may be envisioned by those skilled in the art.

Storage unit 6 of query unit 10 stores the training images or examples retrieved from image database 50 in response to a user's query. Storage unit 6 may be, for example, a hard drive and/or an optical storage device (not shown) associated with a computer comprising part of query unit 10. Storage 6 may also comprise temporary memory such as RAM.

Explicit training instance generator 20 includes a software program which receives a user's query from query unit 10 and accesses database 50 to retrieve therefrom a series of training images which most closely match the user's query. The number of retrieved training images is far less than the total number of possible images selectable as training images from image database 50. The number of retrieved training images can be based on a number selected by the user during an initial set-up process. Of course, the number set for the retrieved training images may be changed at any time, for example, by a user prompt. The amount of time required for the learning process is a function of the quantity of training images, subsequently labeled with user feedback information as discussed below. The higher the number of retrieved training images, the greater the length of the learning process will be.

The retrieved set of explicit training images is supplied to query unit 10 and displayed on display unit 5. First, the system returns a number of retrieval images to match the user's query. Then, the user provides information to label part of the retrieval results as positive or negative training examples. According to the labeling information, the software program of instance generator 20 may perform the operation of subdividing each of the labeled training images into feature instances, which will be further fed into a learning module for modifying the target concept.

Implicit training set generator 30 contains a software program which uses the user's previous query to generate a query index which is sent to database 50 to retrieve additional implicit training image database which are unseen by the user as discussed in detail below.

Figure 9:
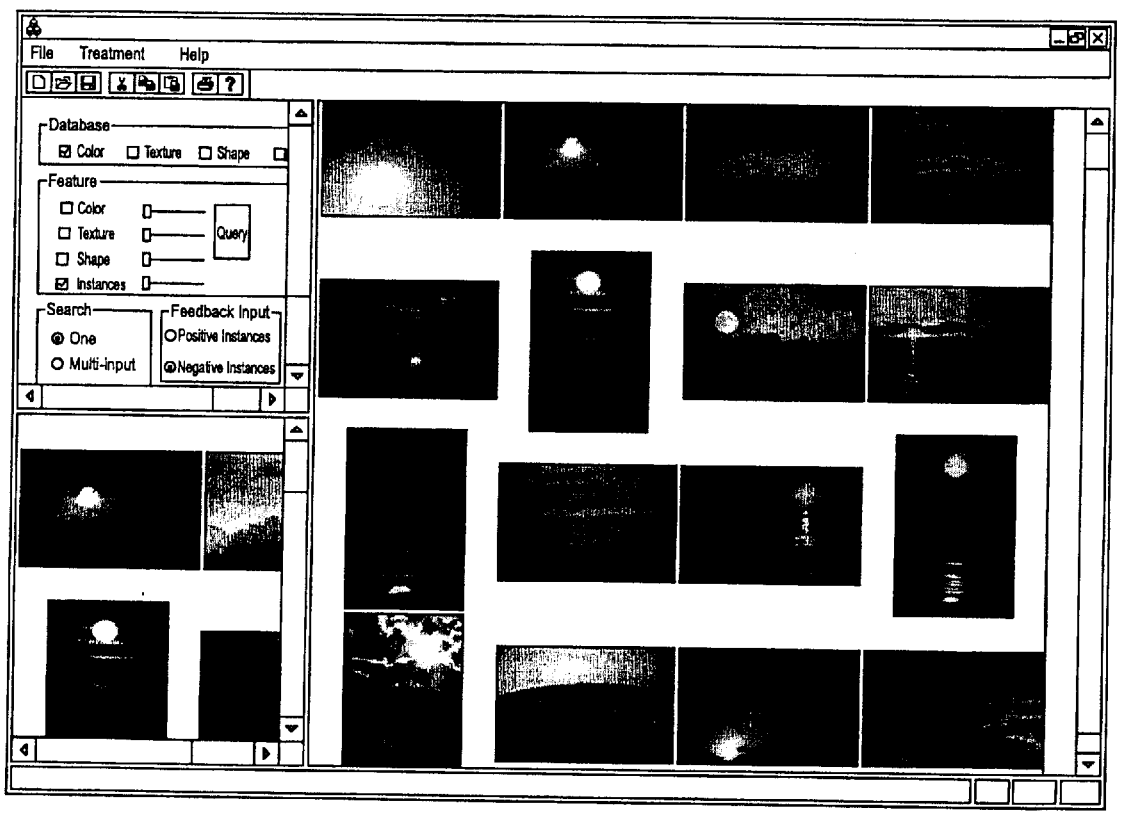
FIG. 9 shows retrieval results of the present invention based on the visual concept "sunset."
Figure 10:
FIG. 10 shows retrieval results of the present invention based on the visual concept "girls."

Learned concept module 40 contains a software program, which receives the explicit training images with user feedback information from query unit 10 and the information from the implicit training image database generator 30. Learned concept unit 40 determines a target concept from the sets of explicit and implicit training images and the user feedback information. Subsequently, learned concept unit 40 uses this learned target concept to retrieve target images from image database 50. The retrieved target images are then output on display unit 5. Examples of retrieved target images are shown in FIGS. 9 and 10. Although FIGS. 9 and 10 show examples of only two categories of images (i.e., sunsets and girls), a nearly unlimited number of categories can be the subject of content-based image retrieval.

Figure 2:
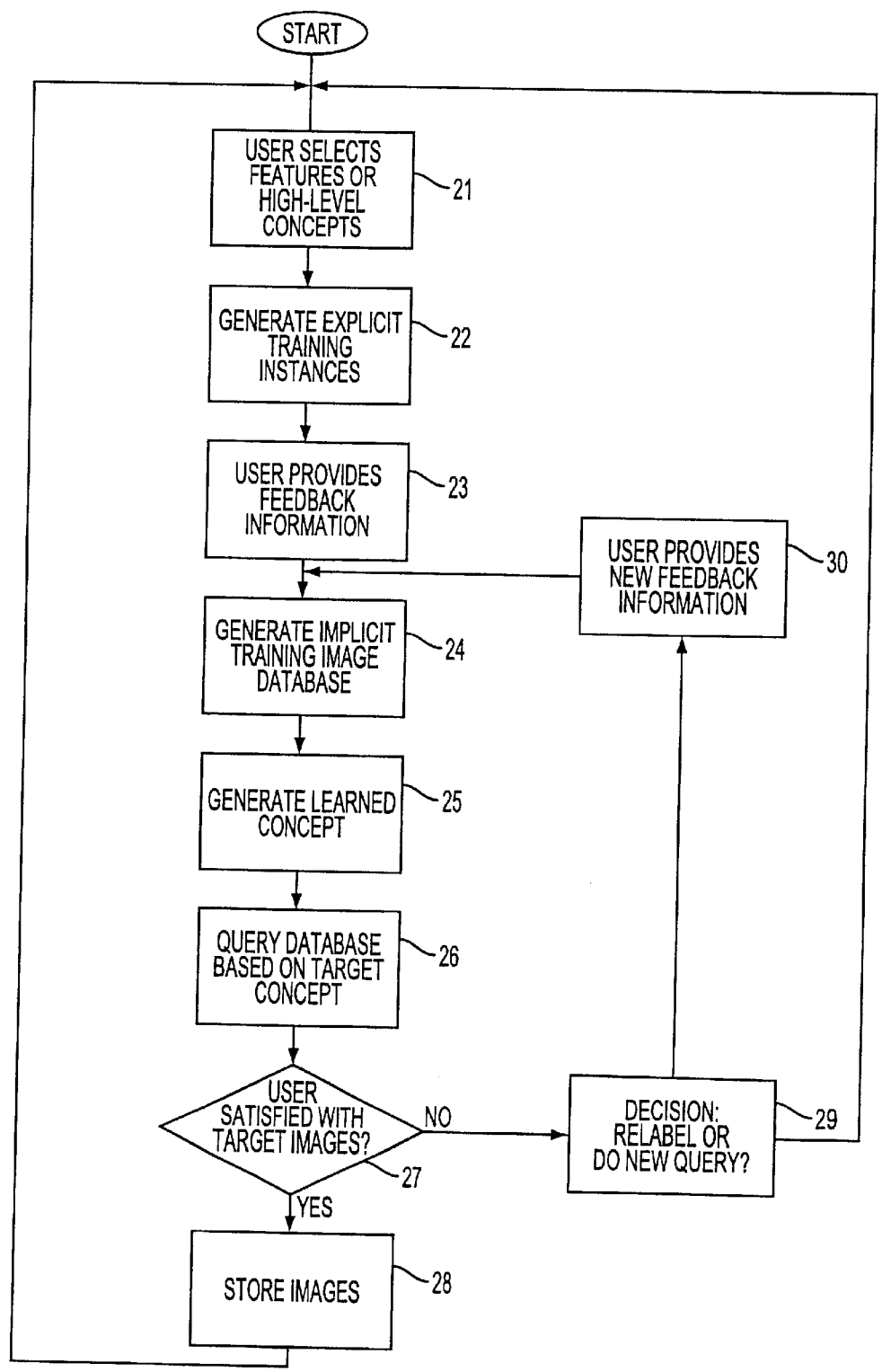
FIG. 2 is a flow chart illustrating the operation of the retrieval apparatus of FIG. 1.

FIG. 2 is a flowchart showing the method and computerized programming steps of the content-based image retrieval system according to the present invention. In step 21, a user selects low-level features such as colors, shapes, or textures, or high-level concepts, which are used as a basis to query data from image database 50. In step 22, generator 20 returns a number of retrieval explicit training images to match the user's query. In step 23, the user provides feedback information for completion of the work of which retrieval image is positive or negative. All the labeled images are collected as a set of explicit training examples. If a training image (bag) is labeled as positive, it contains one or more positive feature instance. If an image (bag) is labeled negative, all feature instances in it are negative. The user's previous labeling information is provided to implicit training image database generator 30. In step 24, implicit training image database generator 30 uses previous query information to get a set of implicit training images from database 50. In step 25, learned concept unit 40 generates a learned or target concept using the feedback information on the explicit training images labeled by the user in step 23 and those implicit images selected from image database 50. The target concept that is learned in learned concept unit 40 is based on the commonality of feature instances in all of the training images representing the concept that the user wants to retrieve. In step 26, database 50 is queried based on the target concept to retrieve a plurality of target images, which are provided to query unit 10 for display on display unit 5 for review by the user. If the user is satisfied by the retrieved target images (step 27), the images are stored (step 28), the present query is completed, and a new query may be initiated by returning to step 21. If the retrieved target images are unsatisfactory, the user decides in step 29 whether to go to step 30 where the user provides new feedback information for the explicit training images or back to step 21 (to begin a new query). In step 30, the user changes the feedback information for the explicit training images with the objective of retrieving a set of target images different than previously retrieved. This process may be repeated until the user is satisfied with the retrieved results.

The specific steps and programmed operations of the method and apparatus of the present invention will now be described in more detail.

First, a background technique will be described. Assume t is the target concept learned from a set of positive and negative images. Given positive bags (a bag is a collection of feature instances) $I_1^+, \ldots, I_m^+$ and negative bags $I_1^-, \ldots, I_n^-$, t is found by maximizing the probability:

$$Pr(t|I_1^+, \ldots, I_m^+, \ldots, I_n^-), \quad (1)$$

that is, by finding the target concept t that is most likely to agree with the data where m and n are the number of positive and negative bags, respectively. According to Bayes' Rules and assuming the bags are conditionally independent, the problem is equivalent to maximizing the likelihood:

$$\prod_{1 \leq i \leq m} Pr(t | I_i^+) \prod_{1 \leq i \leq n} Pr(t | I_i^-). \quad (2)$$

Traditionally, a gradient ascent with multiple starting points is used to find the target concept t by maximizing Equation (2). A major problem with this approach is the selection of starting points. Bad starting points will lead to local maxima. Moreover, the more complicated the hypothesis, the longer it takes to be learned due to the higher number of features and the larger number of feature instances per bag. More importantly, the under-training problem often occurs if the number of positive and negative bags is insufficient.

To overcome these problems, the present invention avoids maximizing Equation (1) or Equation (2), but instead employs a novel approach, which involves learning the embedded concepts from positive and negative examples or bags. More particularly, the present invention incorporates a novel concept which recognizes that, in addition to the explicit training examples provided based on a user's query, there exist other positive and negative implicit (or unknown) useful training examples in database 50. Therefore, when taking account of this situation, Equation (1) should be rewritten as follows:

$$Pr(t|I_1^+, \ldots, I_m^+, I_1^-, \ldots, I_n^-)Pr(t|\bar{I}_1^+, \ldots, \bar{I}_m^+, \bar{I}_1^-, \ldots, \bar{I}_n^-), \quad (3)$$

where $\bar{I}_1^+, \ldots, \bar{I}_m^+$ and $\bar{I}_1^-, \ldots, \bar{I}_n^-$ are the unknown or implicit positive and negative training examples, respectively, in database 50. Then, based on Equation (3), the "true" target concept t can be learned completely.

It is difficult to know the implicit images $\bar{I}_1^+, \ldots, \bar{I}_m^+$ and $\bar{I}_1^-, \ldots, \bar{I}_n^-$ in advance. In the following description, L represents the set of explicit retrieval results after the user's original query, and N represents the desired number of retrieved images in L. $\bar{L}$ represents the set of implicit retrieval results after generator 30 makes a query, and $\bar{N}$ the desired number of retrieved images in $\bar{L}$. L and $\bar{L}$, respectively, denote the sets of the top N and $\bar{N}$ sorted retrieved results after the user's original query (the top results are the ones which most closely match the user's query index based on, for example, a distance calculation), where $\bar{N}$ is a larger number than N, for example, $\bar{N}=5N$. Since the user-selected explicit training examples $I_i$, and the machine-selected implicit training examples $\bar{I}_i$, belong to the same class, a possibility exists that most of the implicit training examples $\bar{I}_i$ will appear in the ranked list $\bar{L}$. With this knowledge, the present invention develops a novel approach to learn the visual or target concept of what a user wants to retrieve by taking advantage of the sorted list $\bar{L}$, as described more fully below.

In essence, the target concept t that maximizes Equation (3) is the one which lets all positive training examples be selected in the list L, but excludes the negative training examples. In other words, if a target concept t is found which results in all positive training examples being listed in L and all negative training examples not being listed in L, this target concept will also maximize Equation (3). However, instead of merely finding a target concept t which maximizes Equation (3), the present invention finds a set of feature instances which represents the visual or target concept with the best ability to distinguish the positive and negative examples from database 50. This technique will now be described with reference to FIGS. 4–8.

Figure 4:
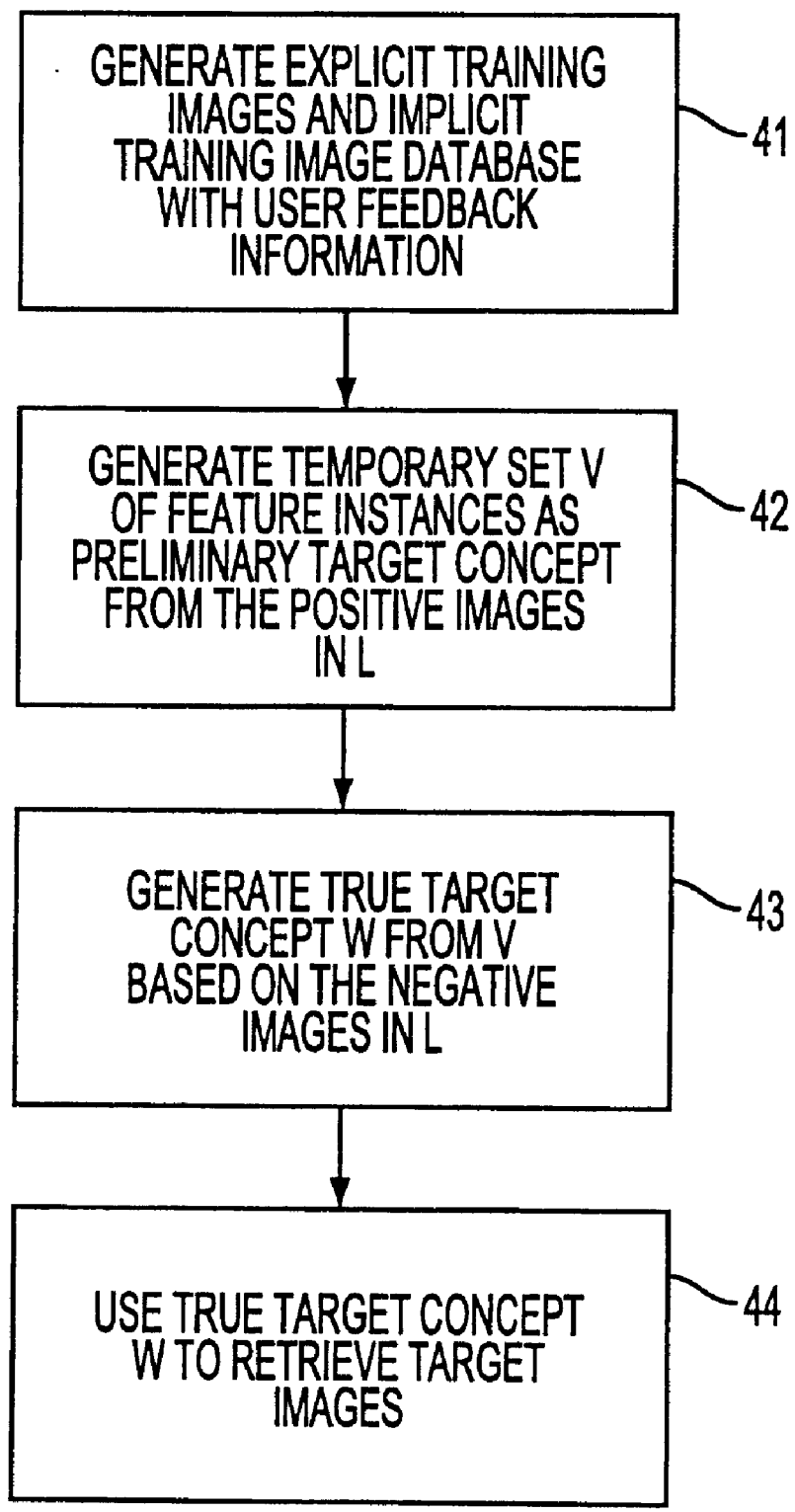
FIG. 4 is a flow chart illustrating how the system learns the true target concept from the positive and negative images.

FIG. 4 is a flowchart showing an overview of the operations carried out in learned concept unit 40 of FIG. 1. In essence, these operations include generating a temporary set V of feature instances constituting a preliminary target concept and a set W of feature instances constituting a true target concept, based on the explicit training images, with user feedback information, and implicit training images. In FIG. 4, the training images are generated in step 41. In step 42, a temporary set V of instances is generated as a possible, tentative or preliminary target concept from the positive training images provided in step 41. In step 43, after the temporary set V is generated, the true or final target concept W can be generated from V based on the negative training images provided in step 41. In step 44, the true target concept is used to retrieve target images which will be displayed as the desired result.

Figure 5:
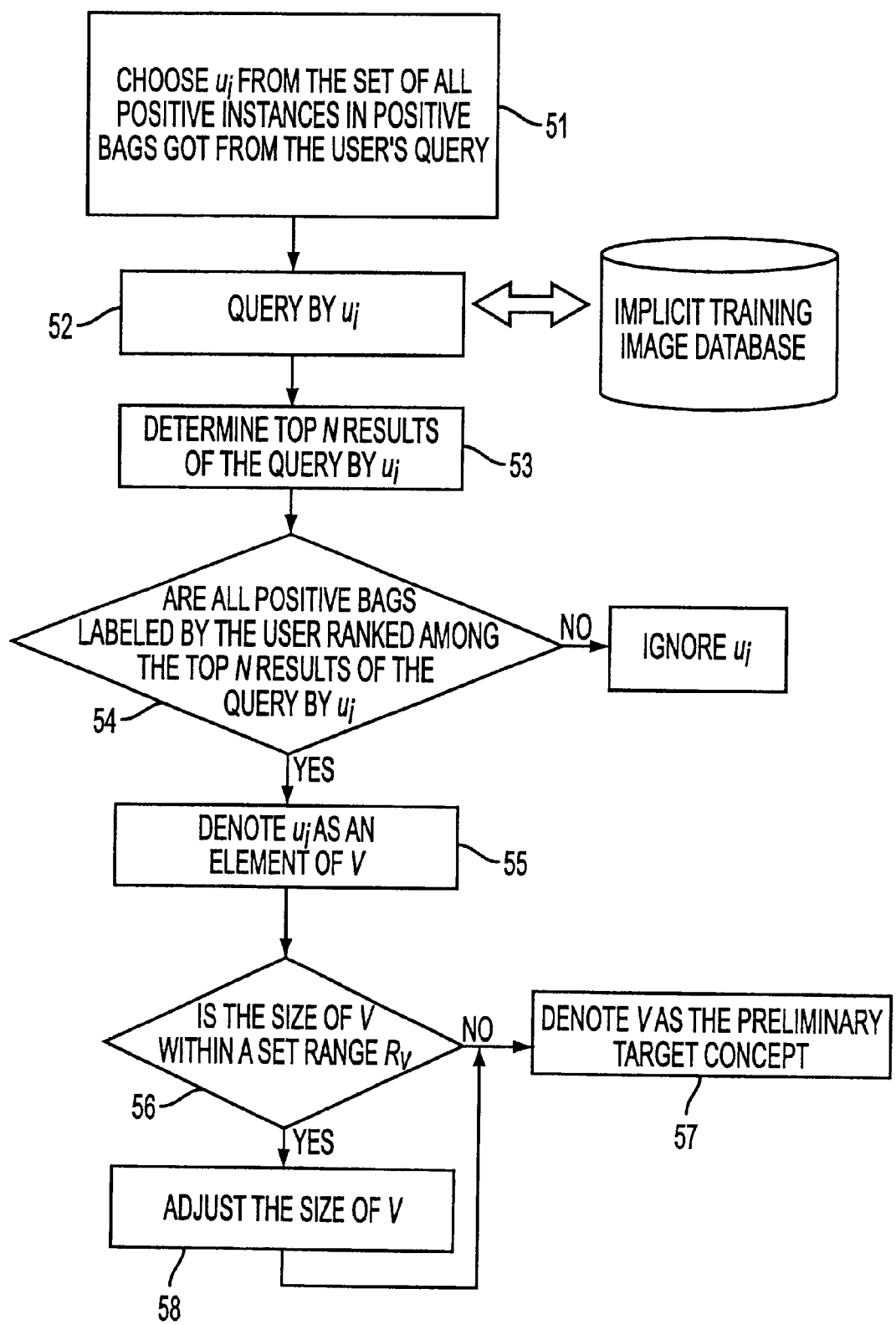
FIG. 5 is a flowchart illustrating the process for obtaining the set V of feature instances as the preliminary target concept from positive images.
Figure 6:
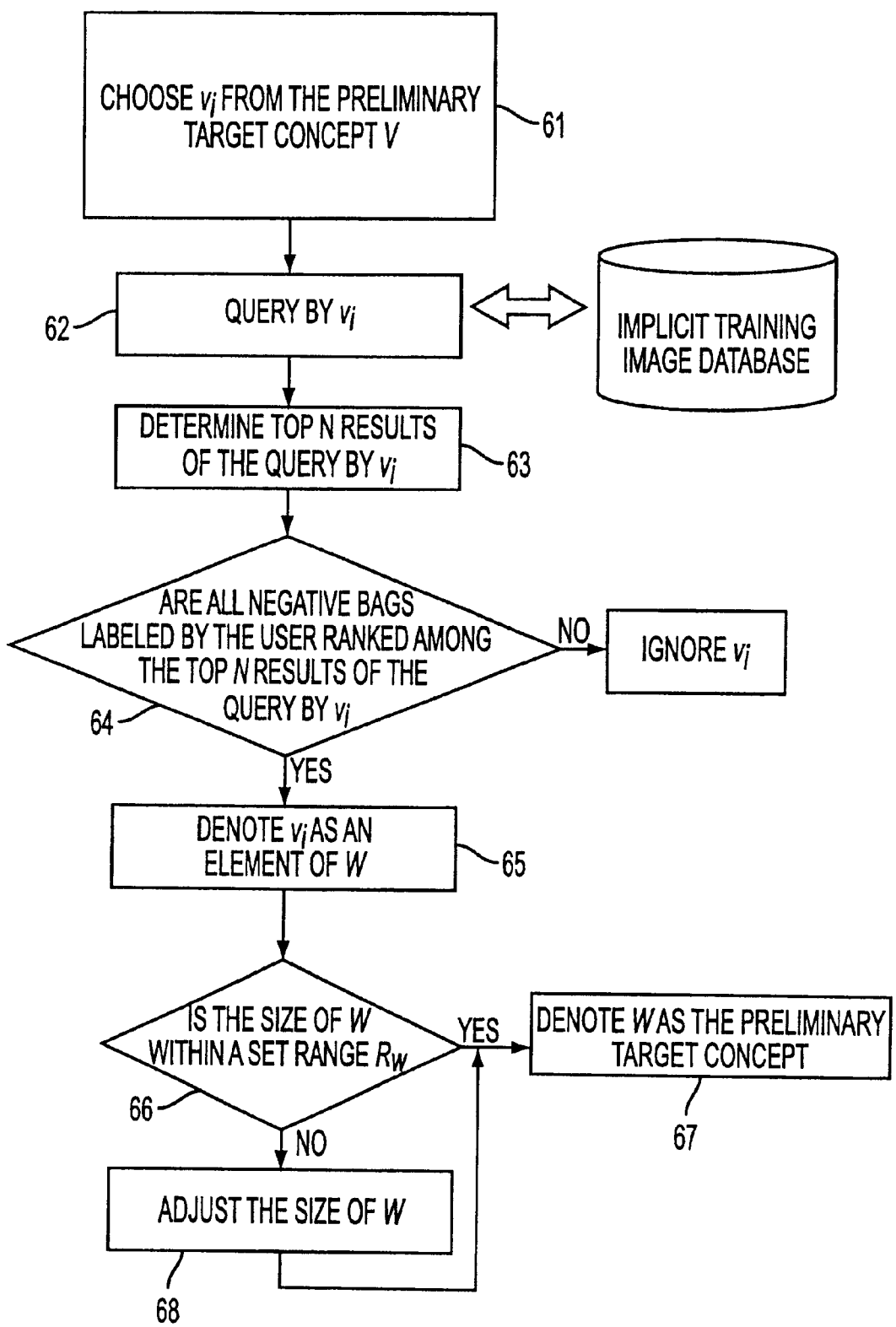
FIG. 6 is a flowchart illustrating the process for obtaining the set W of feature instances of the true target concept based on negative images.

FIGS. 5 and 6 are flowcharts depicting details of the process for finding the temporary set V of instances, and the true target concept W, respectively. Each of the flowcharts of FIGS. 5 and 6 are described in respective stages I and II below.

In step 51, U is determined as the set of all positive instances $u_i$ in the positive bags $I_1^+, \ldots,$ and $I_m^+$ selected from L. The basic concept of finding the true target concept can be divided into two stages as follows:

Stage I: In step 52, a query by $u_i$ is performed on a training image database that comprises the implicit retrieval results $\bar{L}$ from the user's original query. In step 53, the top N results from the query by $u_i$ are identified. In step 54, it is determined whether all positive bags in L previously labeled in accordance with the user's feedback information are ranked among the top N results of the query by $u_i$. If no, this $u_i$ is discarded. If yes, $u_i$ is denoted as an element in the temporary set V (step 55).

Stage II: In step 62 a query by $v_i$ is performed on the training image database $\bar{L}$. In step 63 the top N results of the query by $v_i$ are identified. In step 64 it is determined whether all negative bags in L previously labeled in accordance with the user's feedback information on the user's original query are not ranked among the top N results of the query by $v_i$. If no, $v_i$ is discarded. If yes, $v_i$ is denoted as an element of the set W (step 65).

However, it is necessary in each stage to examine the size of the respective sets V (steps 56 and 58) and W (steps 66 and 68) to determine whether their sizes are within ranges $R_V$ and $R_W$ selected by the user or by the system. If not, the sizes must be adjusted to a desirable level as discussed in detail below with respect to FIGS. 7 and 8.

In the case of W, it is particularly important that its size should be controlled with the goal of enhancing the efficiency of the query. A too large W will sharply decrease the speed of the query; conversely, a too small W will not sufficiently represent the visual or target concept. When further implementing the algorithm of FIGS. 5 and 6, two problems should be addressed. One is how to efficiently select the top N results from the test image database $\bar{L}$ with $u_i$ as a query. The other is how to measure the goodness of the instance $u_i$ as a useful index for adjusting the size of W properly. Each of these problems is addressed in the more detailed description of the present invention provided below with reference to the flow charts of FIGS. 7 and 8.

First, the symbols and terminology of FIGS. 7 and 8 will be discussed. As noted above, $I^+=\{I_1^+, I_2^+, \ldots, I_{M_+}^+\}$ represents the set of all positive bags obtained according to the user's feedback infor mnation, and $M_+$ is its size. $S_{u_i}$ represents the set of the top N query results from the test image database $\bar{L}$ for a query by $u_i$, i.e., when using $u_i$ as the query index. As indicated above, $\bar{L}$ is the set of the top $\bar{N}$ query results from the user's original query. $B_k$ is an image or bag in $\bar{L}$. U is the set of all positive instances in the set of positive bags $I^+$; $u_i$ is an element in U. Finally, $b_{ui}$ is the counter which counts the number of bags in $I^+$ which can be listed in $S_{u_i}$ when $u_i$ is the query index.

Figure 7:
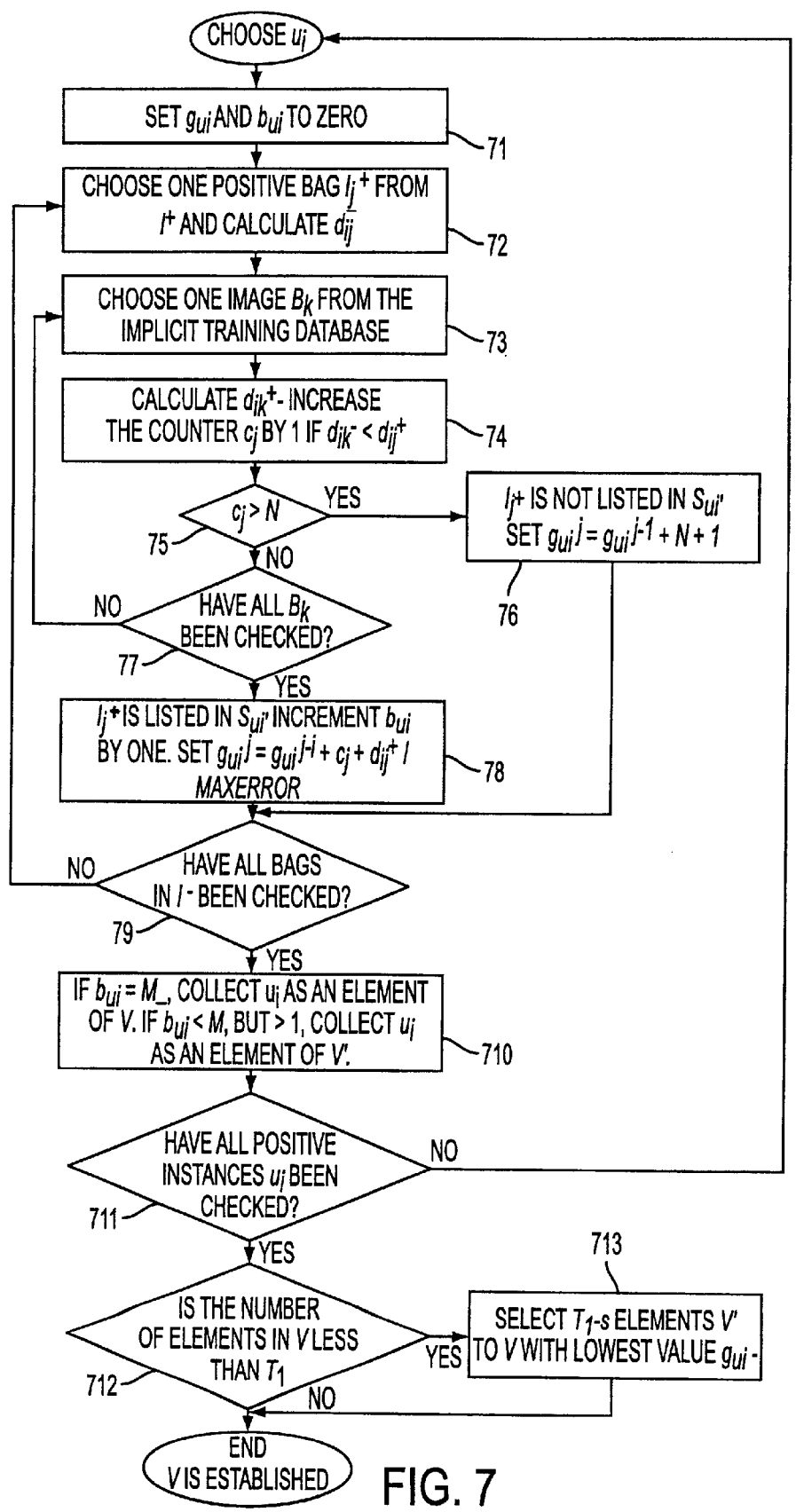
FIG. 7 is a flow chart showing further details of the process illustrated in FIG. 5.

The goal of FIG. 7 is to determine the goodness $g_{u_i}$ of all $u_i$ in U based on how many bags in $I^+$ may be listed in $S_{u_i}$ when using $u_i$ as a query index and $\bar{L}$ as the test image database.

For an instance $u_i$, the distance to (or degree of similarity with) an image or bag $B_k$ in $\overline{L}$ is defined as follows:

$$\text{dis}(u_i, B_k) = \min_l \|u_i - B_{kl}\|, \quad (4)$$

where $B_{kl}$ is an instance in $B_k$ and $\|u_i - B_{kl}\|$ is defined as follows:

$$\|u_i - B_{kl}\| = \sum_j w_j(u_{ij} - B_{klj})^2, \quad (5)$$

where $B_{klj}$ is the value of the $j^{th}$ feature in the $l^{th}$ instance in the $k^{th}$ bag, and $w_j$ is a weight. Bags $B_k$ in $\overline{L}$ are ranked by their distance from $u_i$ to obtain $S_{u_i}$ (the top N results of the query by $u_i$).

Given an instance $u_i$ in U, FIG. 7 illustrates a procedure to evaluate whether $u_i$ is a good candidate of the preliminary target concept V. As noted above, $g_{u_i}$ denotes the goodness of an instance $u_i$. The value of $g_{u_i}$ is iteratively calculated according to how many bags in $I^+$ can be listed in $S_{u_i}$, when using $u_i$ as a query index. Step 71 involves first setting $g_{u_i}^0$ and $b_{u_i}$ to zero for initialization. Steps 72–79 represent a process for examining each bag $I_j^+$ in $I^+$ as follows. In step 72, calculate $d_{ij}^+$ which is the distance between $u_i$ and $I_j^+$, that is, $d_{ij}^+ = \text{dis}(u_i, I_j^+)$. In step 73, choose one image $B_k$ in $\overline{L}$ and in step 74 calculate $d_{ik}^+$ for each image $B_k$ in $\overline{L}$, and increase the number $c_j$ by one if the distance $d_{ik}^+$ between $u_i$ and $B_k$ is less than $d_{ij}^+$, where $d_{ik}^+ = \text{dis}(u_i, B_k)$. Step 75 compares the value of $c_j$ with N. If $c_j$ is larger than N, it is impossible for $I_j^+$ to be listed in $S_{u_i}$ (step 76). Therefore, further counting the value of $c_j$ is not necessary. If this condition happens, set $g_{u_i}^j = g_{u_i}^{j-1} + N+1$ (step 76) and go to step 79 for checking the next bag $I_{j+1}^+$; if not, the process returns to step 73 to examine the next image $B_{k+1}$ in $\overline{L}$. If $c_j$ is less than N (step 75), step 78 is carried out to (1) list $I_j^+$ in $S_{u_i}$, (2) increment by one the bag counter $b_{u_i}$, which is used to record the number of bags in $I^+$ which can be listed in the list $S_{u_i}$ and (3) calculate the index $g_{u_i}^j$ as follows:

$$g_{u_i}^j = g_{u_i}^{j-1} + (c_j + d_{ij}^+/\text{MaxError}), \quad (6)$$

where MaxError is the maximum of $d_{ij}^+$ used for normalization. Next, step 79 checks whether all the bags $I^+$ have been checked. If no, the process returns to step 72; if yes, all bags in $I^+$ have been checked and the operation proceeds to step 710.

After checking all the bags in $I^+$, the values of $g_{u_i}$ and bag counter $b_{u_i}$ are saved. In step 710, based on $b_{u_i}$, it is determined whether $u_i$ is a good candidate of V according to the following conditions:

a) if $b_{u_i}$ is equal to $M_+$, collect $u_i$ as an element of V;
b) if $b_{u_i}$ is less than $M_+$ but larger than 1, collect $u_i$ as an element of V'.

Step 711 determines whether all the instances $u_i$ in U have been examined. If not, the operation proceeds to examine the next element $u_{i+1}$ in u by proceeding to step 71. If yes, the operation proceeds to refine the set V of possible common instances.

In order to achieve better representation of the embedded visual concept, the size of V should be controlled. A predefined threshold $T_1$ is used to control the size of V (denoted as s). If the size of V is less than $T_1$ (step 712), select $(T_1-s)$ elements from V' for inclusion in V (the elements of V' have been sorted according to the values of $g_{u_i}$) in step 713. The less the value of $g_{u_i}$, the more important the instance $u_i$ is.

The above procedure is used to find a possible visual concept V from the positive training examples.

Figure 8:
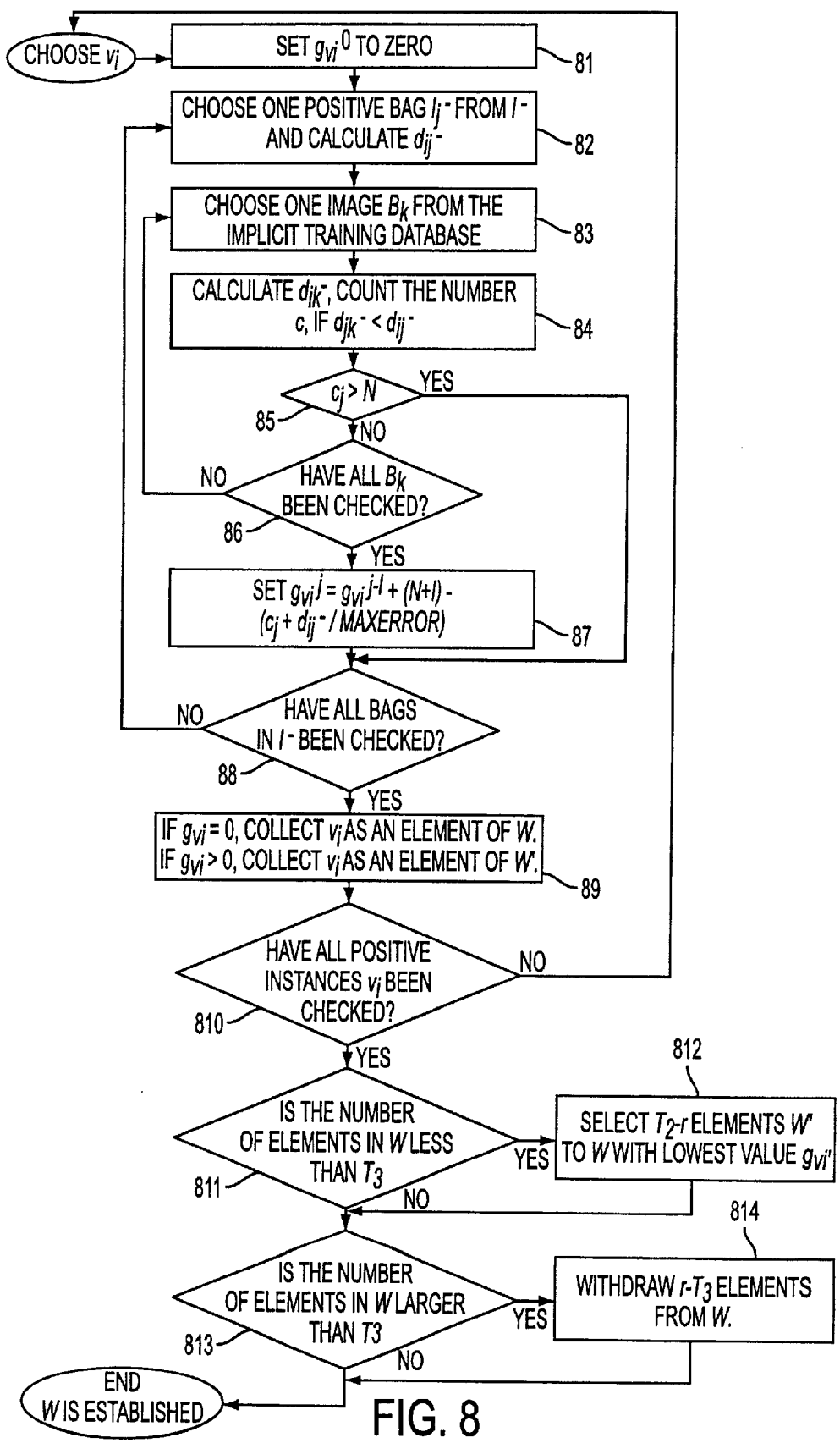
FIG. 8 is a flow chart showing further details of the process illustrated in FIG. 6.

According to the present invention, the set V is further refined by using negative examples in accordance with the operations illustrated in FIG. 8. Therefore, the procedure of FIG. 8 realizes Stage II of the algorithm for refining the set V to obtain the desired solution W as the target concept based on negative examples.

As noted above, $I^- = \{I_1^-, I_2^-, \ldots, I_{M_-}^-\}$ is the set of all negative bags got from user's feedback information and $M_-$ is its size. In essence, the goal of Stage II is to refine set V using negative examples to obtain the desired solution W as the true target concept. This is done by determining the goodness $g_{v_i}$ of all $v_i$ in V based on whether no negative bag in $I^-$ appears in $S_{v_i}$. In other words, given an instance $v_i$ in V, the procedure to determine whether $v_i$ is a good candidate of W involves determining the goodness $g_{v_i}$ of $v_i$ according to the condition whether all the negative bags $I^-$ do not appear in $S_{v_i}$ with respect to a query by $v_i$ and the test database $\overline{L}$. If this condition is true, then $v_i$ is a good candidate to be an element of W.

FIG. 8 is a flow chart of this procedure. First, in step 81, set $g_{v_i}^0$ to zero for initialization. Steps 82–88 represent a procedure for examining each bag $I_j^-$ in $I^-$ as follows. In step 82, calculate the distance $d_{ij}^-$ between $v_i$ and $I_j^-$, that is, $d_{ij}^- = \text{dis}(v_i, I_j^-)$. In step 84, calculate $d_{ik}^-$ for each image $B_k$ in $\overline{L}$, and in step 84 count the number $c_j$ of images $B_k$ in $\overline{L}$ for which the distance $d_{ik}^-$ between $v_i$ and $B_k$ is less than $d_{ij}^-$, where $d_{ik}^- = \text{dis}(v_i, B_k)$. Step 85 compares $c_j$ with N. If $c_j$ is larger than N, it is impossible for $I_j^-$ to appear in $S_{v_i}$. This means we can stop the examination and go directly to step 88 for examining next $I_{j+1}^-$. Otherwise, continue the checking process. Once all images in $\overline{L}$ have been examined, $g_{v_i}$ is updated as follows:

$$g_{v_i}^j = g_{v_i}^{j-1} + (N+1) - (c_j + d_{ij}^-/\text{MaxError}). \quad (7)$$

Step 88 determines whether the bags in $I^-$ have been checked. If no, the process returns to step 82 to examine the next $I_{j+1}^-$; if yes, the operation proceeds to step 89. Thus, after checking all negative training examples $I_j^-$ in $I^-$, the value $g_{v_i}$ is obtained (step 810). Step 89 involves checking whether $g_{v_i}$ is equal to zero. If yes, no example or bag in $I^-$ can be listed in the list $S_{v_i}$. For this case, collect $v_i$ as an element of W; otherwise, collect $v_i$ as an element of W'. Step 810 involves checking whether all $v_i$ have been examined. If not, the process returns to step 81 to examine the next $v_{i+1}$, in V. After examining all the instances $v_i$ in V, the desired set W is obtained to represent the visual concept embedded in all example images. However, the size of W should also be controlled (steps 811–814). Let $T_2$ and $T_3$ be two predefined thresholds used to control the size of W (denoted as r). If r is less than $T_2$ (step 811), transfer $(T_2-r)$ elements from W' into W according to the value of $g_i$ (step 812). Conversely; if r is larger than $T_3$ (step 813), withdraw $(r-T_3)$ elements from W with $g_{v_i}$ as an index (step 814) for improving the speed of the query. During a query, the value of $g_{v_i}$ also can be used as a weight to measure the importance of an instance $v_i$. That is, the distance between the concept W and an image $I_k$ in the testing database $\overline{L}$ can be defined as follows:

$$d(W, I_k) = \sum_l \text{dis}(v_l, I_k)/\overline{g}_{v_l},$$

where $v_l$ is an instance of W and $\overline{g}_{v_l}$ is a normalization value of $g_{v_l}$, that is, $$\overline{g}_{v_l} = g_{v_l} / \sum_i g_{v_i}$$

for each $v_l$ in W. Therefore, once the set W is obtained, the desired target images can be effectively retrieved from the image database with the instances in W.

Performance of the Invention

In order to analyze performance, the present inventors have implemented an interactive image retrieval system that allows users to search desired images from a database. The database contains 3600 images which come from 100 categories in COREL™ photo galleries. The categories include cars, humans, dogs, waterfalls, mountains, sunsets, etc. All the images are smoothed using a Gaussian filter and down-sampled to 16×16 images, in which 16 instances are generated per image and recorded as the indices of this image. The type of feature instances used in this system is shown in FIG. 3A. Initially, this system allows users to query data with a single image using features such as colors, shapes, textures, or instances. Based on the retrieved results and with the user's interactive relevance feedback, a number of positive and negative training examples are selected. The commonality of instances is learned from the selected training examples, as the learned concept. All the learned concepts are learned on-line. FIG. 9 shows the results of running this system on the sunset example images. The top 16 retrieved images, which are consistent with the concept of "sunset," are displayed. FIG. 10 shows the results for the concept "girls" with three positive and two negative examples. The superiority of the present invention is clearly demonstrated in these examples.

Although the present invention has been fully described by way of examples with reference to the accompanying drawings, it should be understood that numerous variations, modifications and substitutions, as well as rearrangements and combinations, of the preceding embodiments will be apparent to those skilled in the art without departing from the novel spirit and scope of this invention. For example, devices or units described above as containing software programs to carry out certain functions could alternatively be hardwired or could use firmware to perform these functions.

We claim:

1. A method of content-based image retrieval, the method comprising:
   (a) generating a plurality of training images, the plurality of training images comprising a first part and a second part;
   (b) labeling each training image of the first part as one of a positive bag and a negative bag, each training image labeled a positive bag if the training image has a desirable character and labeled a negative bag if the training image does not have a desirable character;
   (c) identifying a set of N1 training images, from a set of all training images of the second part, that have a feature most closely matching a first feature instance of a training image labeled as a positive bag;
   (d) calculating a first value, corresponding to the first feature instance, based on the number of images labeled as positive bags that are identified in the set of N1 training images;
   (e) determining whether to include the first feature instance in a preliminary target concept, which comprises a set of second feature instances, based on the first value;
   (f) generating a revised target concept using the preliminary target concept and one or more of the training images labeled as negative bags; and
   (g) retrieving a set of target images in accordance with the revised target concept.

2. The method of claim 1, further comprising:
   (h) identifying a set of N2 training images, from the set of all training images of the second part, that have a feature most closely matching a second feature instance from the set of second feature instances;
   (i) calculating a second value, corresponding to the second feature instance, based on the number of images labeled as negative bags that are not identified in the set of N2 training images; and
   (j) determining whether to include the second feature instance in the revised target concept based on the second value.

3. The method of claim 1, wherein the plurality of training images is generated in response to a user's query, the first part comprises explicit training images, and the second part comprises an implicit training image database.

4. A method of content-based image retrieval, the method comprising:
   (a) generating a plurality of training images comprising a first part and a second part;
   (b) extracting a first set of feature instances from the first part;
   (c) labeling the feature instances of the first set as positive feature instances or negative feature instances;
   (d) labeling the training images of the first part having at least one positive feature instance therein as a positive bag and labeling the training images of the first part having no positive feature instance therein as a negative bag;
   (e) generating a preliminary target concept from an amount of similarity between (i) the training images labeled as positive bags and (ii) the training images identified by a query of the second part using the positive feature instances, the preliminary target concept comprising a first subset of the first set of feature instances;
   (f) generating a revised target concept from an amount of dissimilarity between (iii) the training images labeled as negative bags and (iv) the training images identified by a query of the second part using the first subset of feature instances, the revised target concept comprising a second subset of the first set of feature instances; and
   (g) retrieving a set of target images in accordance with the revised target concept.

5. The method of claim 4, wherein step (e) further comprises:
   calculating a first distance between a first one of the positive feature instances and one of the positive bags;
   counting a number of images $B_k$ of the second part for which a second distance between $B_k$ and the first one of the positive feature instances is less than the first distance; and
   selecting the first one of the positive feature instances as an element of the preliminary target concept if the number is less than a first threshold.

6. The method of claim 5, wherein step (f) further comprises:
   calculating a third distance between the selected element of the preliminary target concept and one of the negative bags;

counting a second number of the images Bk of the second part for which a fourth distance between Bk and the selected element of the preliminary target concept is less than the third distance; and assigning the selected element of the preliminary target concept as an element of the revised target concept if the second number is less than a second threshold.

7. The method according to claim 4, wherein the first part comprises explicit training images, the second part comprises an implicit training image database obtained through a user's previous query, and the labeling of the explicit training images is performed by a user.

8. An apparatus for content-based image retrieval, comprising:

(a) a query unit that generates a user's query;

(b) a training instance generator that generates a set of explicit training images, retrieved from a source database, in accordance with the user's query;

(c) a first labeling means for providing user feedback information and labeling feature instances of the explicit training images as positive feature instances or negative feature instances based on the feedback information;

(d) a second labeling means for labeling each of the explicit training images having at least one positive feature instance therein as a positive bag and for labeling each of the explicit training images having no positive feature instance therein as a negative bag;

(d) a training set generator that generates an implicit training image database based on the user's query;

(e) a learned concept unit that generates a preliminary target concept from the explicit training images labeled as positive bags, generates a revised target concept in accordance with: (i) the explicit training images labeled as negative bags, (ii) the user feedback information, and (iii) the implicit training images, and retrieves a set of target images from the source database in accordance with the revised target concept.

9. The apparatus of claim 8, wherein:

the learned concept unit generates the preliminary target concept by calculating a first distance between a first one of the positive feature instances and one of the explicit training images labeled as the positive bag;

the learned concept unit counts a number of images $B_k$ of the implicit training image database for which a second distance between $B_k$ and the first one of the positive feature instances is less than the first distance; and the learned concept unit selects the first one of the positive feature instances as an element of the preliminary target concept if the number is less than a first threshold.

10. The apparatus of claim 9, wherein:

the learned concept unit generates the revised target concept by calculating a third distance between the selected element of the preliminary target concept and one of the explicit training images labeled as the negative bag;

the learned concept unit counts a second number of images $B_k$ of the implicit training image database for which a fourth distance between $B_k$ and the selected element of the preliminary target concept is less than the third distance; and the learned concept unit assigns the selected element of the preliminary target concept as an element of the revised target concept if the second number is less than a second threshold.

11. The apparatus of claim 8, wherein the first and second labeling means are part of a single unit.

* * * * *